US008667284B2

(12) United States Patent
Renganathan et al.

(10) Patent No.: US 8,667,284 B2
(45) Date of Patent: Mar. 4, 2014

(54) DETECTION OF INVALID ESCROW KEYS

(75) Inventors: Venkataramann Renganathan, Sammamish, WA (US); Brian Thomas Carver, Kirkland, WA (US); Daniel Browne Jump, Redmond, WA (US); David Charles LeBlanc, Monroe, WA (US); Samuel Ira Weiss, Sacramento, CA (US)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 13/350,360

(22) Filed: Jan. 13, 2012

(65) Prior Publication Data

US 2013/0185557 A1    Jul. 18, 2013

(51) Int. Cl.
G06F 7/04    (2006.01)

(52) U.S. Cl.
USPC ........... 713/170; 713/168; 713/169; 713/171; 713/172; 713/173; 726/27; 726/28; 726/29; 726/30

(58) Field of Classification Search
USPC ........................................................ 713/170
See application file for complete search history.

(56) References Cited

U.S. PATENT DOCUMENTS

| | | |
|---|---|---|
| 6,931,549 B1 | 8/2005 | Ananda |
| 2006/0136723 A1 | 6/2006 | Taylor |
| 2007/0297608 A1 | 12/2007 | Jonas et al. |
| 2008/0005024 A1 | 1/2008 | Kirkwood |
| 2010/0005318 A1* | 1/2010 | Hosain ........................ 713/193 |
| 2010/0142713 A1 | 6/2010 | Perlman |
| 2011/0047371 A1 | 2/2011 | Timby |
| 2011/0246772 A1 | 10/2011 | O'Connor et al. |
| 2011/0252234 A1 | 10/2011 | DeAtley et al. |
| 2011/0252236 A1 | 10/2011 | DeAtley et al. |
| 2011/0252243 A1 | 10/2011 | Brouwer et al. |

OTHER PUBLICATIONS

Bellare, Mihir, et al., "Encapsulated Key Escrow," MIT Laboratory for Computer Science Technical Report 688, Apr. 1996. Latest version available at http://www-cse.ucsd.edu/users/mihir, pp. 1-28.
Denning, Dorothy F, et al., "A taxonomy for key escrow encryption systems," Communications of the ACM, Mar. 1996, vol. 39. No. 3, pp. 34-40.
Torrey, Jacob, "The Ethics of Key Escrow for Computer Encryption," Humanities 2, Dec. 31, 2005, pp. 1-12.
PCT International Search Report and Written Opinion in Application PCT/US2013/020913, mailed Apr. 25, 2013, 9 pgs.

* cited by examiner

Primary Examiner — Longbit Chai
(74) Attorney, Agent, or Firm — Jim Ross; Brian Haslam; Micky Minhas

(57) ABSTRACT

A secure hash, such as a Hash-based Message Authentication Code ("HMAC"), is generated using a piece of secret information (e.g., a secret key) and a piece of public information specific to each escrow key (e.g., a certificate hash or public key). Using the secret key ensures that escrow key validation data can only be generated by knowing the secret key, which prevents an attacker from generating the appropriate escrow key validation data. Using the certificate hash as the public data ties each escrow key validation data to a particular certificate, thereby preventing the attacker from simply copying the validation data from another escrow key. Any escrow key that is found to be invalid may be removed from the file container and a system audit log may be generated so that a company, individual, or other entity can be aware of the possible attempt at a security breach.

20 Claims, 4 Drawing Sheets

DETECTION OF INVALID ESCROW KEYS

BACKGROUND

Document creation applications, such as word processing applications, spreadsheet applications, and presentation applications, sometimes provide a document encryption mechanism through which a user can provide a password that is used to encrypt a document to prevent unauthorized access to information contained therein. The information contained in encrypted documents may, at some time or another, be needed by others that are not privy to the password. For instance, when a document is encrypted by a password created by an employee of a company and the employee leaves the company or simply forgets the password, nobody can access the document, which could contain critical and confidential company information such as human resources or financial information.

In an effort to enable decryption of an encrypted document without knowing a password, an escrow key mechanism can be used. An escrow key mechanism is a configurable mechanism to automatically add certificate-based decryption keys, called escrow keys, in password-protected documents. The escrow key mechanism enables password-protected documents to be decrypted using a certificate without requiring knowledge of the password so as to enable a document recovery scenario in instances such as described above.

Encrypted documents sometimes utilize a two-step system. For instance, each time a document is saved, a randomly generated secret key is used to encrypt the entire document. A password provided by the user is used to derive a new key, which is used to encrypt the secret key. The encrypted secret key may be stored in the document as plain text. To decrypt the document, the key is derived from the user-entered password and is used to decrypt the secret key, which is then used to decrypt the document.

The escrow key mechanism works by encrypting the secret key using a configured public key, which may or may not be contained in a certificate, for the document. The encrypted secret key (i.e., the escrow key) is also added to the document, along with the password-encrypted secret key. Anyone with the private key can then decrypt the secret key, and hence the document. Because the secret key changes each time the document is saved, any existing escrow keys in the document need to be updated with the new secret key. The escrow key mechanism is not without vulnerabilities to attackers that seek to gain access to a protected document.

It is with respect to these and other considerations that the disclosure made herein is presented.

SUMMARY

Concepts and technologies are described herein for the detection of invalid escrow keys, such as those inserted into a file by an attacker. By way of example, and to illustrate a potential vulnerability with the use of the escrow key mechanism described above, consider a scenario in which an attacker gains access to a password-protected file, but the attacker does not have the password and therefore is unable to open the file. The attacker can modify the file container to include his or her own escrow key. Because the attacker does not know the secret key, the newly added malicious escrow key is not valid. In other words, the malicious escrow key contains a key other than the actual intermediate encryption key. When a legitimate user then opens and subsequently re-saves the file, all escrow keys in the file container could be updated with a new secret key. As a result of this update, the attacker's malicious escrow key now has a valid encrypted secret key (i.e., the new secret key) instead of the incorrect key it originally contained. The attacker is accordingly able to decrypt and access the file, thereby circumventing the escrow key mechanism.

The concepts and technologies disclosed herein provide a mechanism by which existing escrow keys in a file can be refreshed and maintained after the file is saved, without enabling the above attack scenario. Escrow keys cannot be decrypted to check validity since only a certificate owner is able to decrypt an escrow key. The concepts and technologies described herein also provide a mechanism to validate each escrow key in a file container without having to access a certificate's private key.

According to one aspect, a secure hash, such as a Hash-based Message Authentication Code ("HMAC"), is generated using a piece of secret information (e.g., a secret key) and a piece of public information specific to each escrow key (e.g., a certificate hash, or a public key). Using the secret key ensures that escrow key validation data can only be generated by knowing the secret key, which prevents an attacker from generating the appropriate escrow key validation data. Using the certificate hash or public key as the public data ties each escrow key validation data to a particular certificate, thereby preventing the attacker from simply copying the validation data from another escrow key. Any escrow key that is found to be invalid may be removed from the file container and a system audit log may be generated so that a company, individual, or other entity can be aware of the possible attempt at a security breach. A similar, but not malicious, condition could occur if the document were edited by a version of the software which was unaware of the need to update a previously legitimate escrow key. In either case, whether the supplied escrow keys should be updated or not can be detected.

According to another aspect, during a save operation performed to save a file, validation data is added to each escrow key in a file container. Then, during an open operation performed to open the file, validation data is generated and compared to the validation data that was added to each escrow key during the save operation. If a match exists, the escrow key is determined to be valid. Otherwise, the escrow key is determined to be invalid and the escrow key may be removed from the file container and may be logged.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
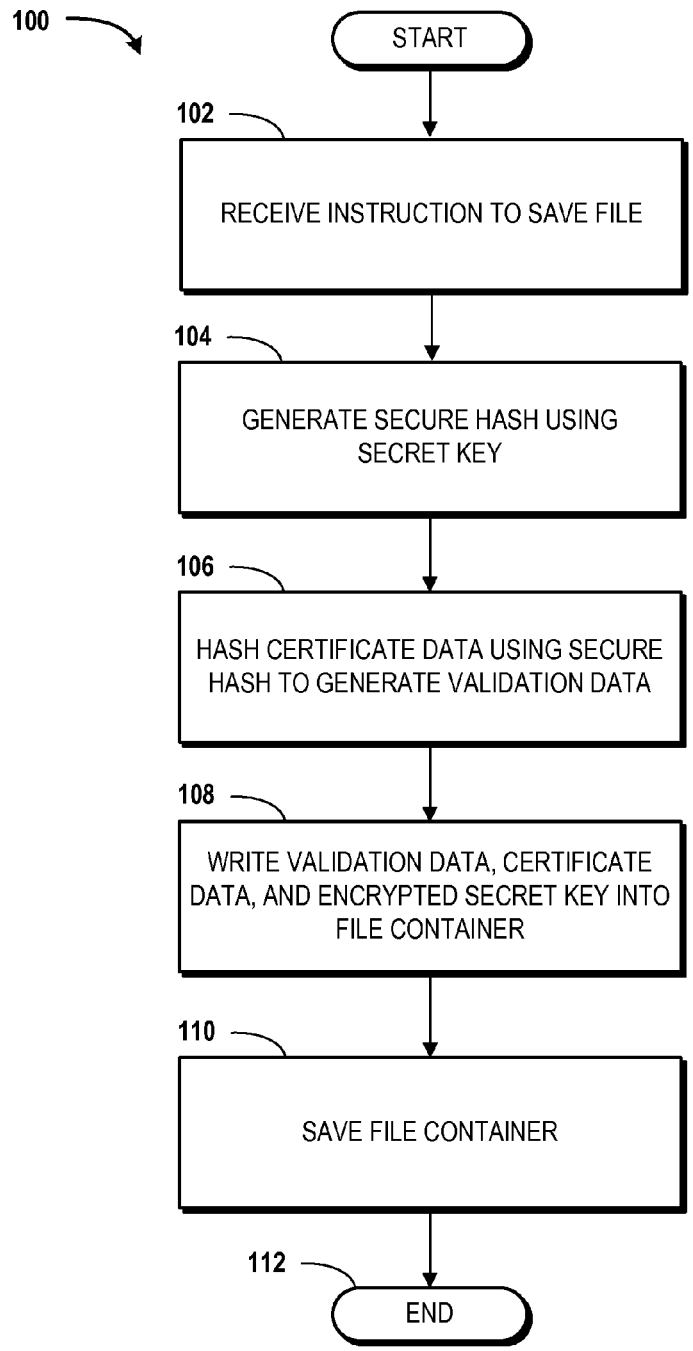
FIG. 1 is a flow diagram showing aspects of a method for adding validation data to a document for one or more escrow keys, according to an illustrative embodiment.

The following detailed description is directed to concepts and technologies for the detection of invalid escrow keys. According to one aspect of the concepts and technologies described herein, a secure hash, such as an HMAC, is generated using a piece of secret information (e.g., a secret key) and a piece of public information specific to each escrow key (e.g., a certificate hash). The secret key can be stored in encrypted information protected by an intermediate key, which is only known to someone who is authorized to decrypt the document. Using the secret key ensures that escrow key validation data can only be generated by knowing the secret key, which prevents an attacker from generating the appropriate escrow key validation data. Using the certificate hash or public key as the public data ties each escrow key validation data to a particular certificate, thereby preventing the attacker from simply copying the validation data from another escrow key. Any escrow key that is found to be invalid may be removed from the file container and a system audit log may be generated so that a company, individual, or other entity can be aware of the possible attempt at a security breach.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for the detection of invalid escrow keys will be presented.

Turning now to FIG. 1, aspects of a method 100 for adding validation data to a file for one or more escrow keys will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single processor or multiprocessor systems, minicomputers, mainframe computers, personal computers, hand-held computing devices, processor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 100 is described as being performed during a save operation executed to save a file. The aspects described herein below are not necessarily particular to a certain application, application type, file, or file type. In some embodiments, an application is configured to open a file in a first state, receive user input, such as edits or other interactions, and save the file in a second state that is different from the first state. In other embodiments, the file is saved, but no changes are made to the file data. In some embodiments, the file is saved with changes to metadata, formatting parameters, or to other data contained within the file that is not file data. In some embodiments, the application is configured to save the file, but may or may not have the capability to perform operations beyond opening and saving. For instance, the application, in some implementations, may not be configured to edit the file in any way. In some embodiments, the save operation includes a copy and paste operation, wherein a first file is copied and pasted thereby creating and saving a new file.

In some embodiments, the file is a document, such as a word processor document, a spreadsheet document, a presentation document, a drawing document, or a collaboration document. In some embodiments, the application used to create and/or view such documents is, respectively, a word processing application such as MICROSOFT WORD, available from Microsoft Corporation of Redmond, Wash.; a spreadsheet application such as MICROSOFT EXCEL, available from Microsoft Corporation of Redmond, Wash.; a presentation application such as MICROSOFT POWERPOINT, available from Microsoft Corporation of Redmond, Wash.; a drawing application such as MICROSOFT VISIO, available from Microsoft Corporation of Redmond, Wash.; or a collaboration application such as MICROSOFT SHAREPOINT, available from Microsoft Corporation of Redmond, Wash. In some embodiments, the application is a read-only application configured to allow a user to view but not edit a document. In other embodiments, the application is a read/write application configured to allow a user to view and edit a document. The application may be a stand-alone application installed locally on a computer system, a remote application installed on a remote system that is access remotely by a computer system, or a web application. Other document types and the associated applications are contemplated.

The method 100 is also described for a file that contains one or more escrow keys. Alternatively or additionally, a file container that contains the file may contain one or more escrow keys. Some escrow keys may be stored in the file container while others may be stored in the file itself The file container is a container or wrapper meta-file format whose specification describes how different data elements and metadata coexist in the file.

The method 100 begins at operation 102, wherein an instruction to save a file is received. The instruction to save the file may be received through a graphical user interface ("GUI") or other user interface presented by or for an application configured to save the file. The GUI may be represented as a menu or part of a menu, as an icon, as a ribbon interface or part of a ribbon interface, as a pop-up GUI, some combination thereof, or the like. The instruction to save the file may be received via an interface device, such as a keyboard, keypad, mouse, gamepad, remote control device, or via any other interface device that, through one or more buttons, touchscreens, touchpads, microphones, or other man-machine interface that provides a mechanism by which a user can instruct the application to save the file. A dedicated or programmed physical save button on one or more of these interface devices is contemplated.

The remaining operations of the method 100 are performed during a save operation triggered by the instruction to save the file received in operation 102. From operation 102, the method 100 proceeds to operation 104, wherein a secure hash is generated using a secret key. The secret key, in some embodiments, is randomly or pseudo-randomly generated and is used to encrypt the file. In some embodiments, the secret key is encrypted using a password provided by a user. In some embodiments, the encrypted secret key is stored in the file in plain text. Alternatively, the encrypted secret key may be stored in the file in some other format.

The secure hash generated in operation 104, in some embodiments, is a Hashed Message Authentication Code, or otherwise termed a Hashed Message Authentication Checksum ("HMAC"). In some embodiments, the HMAC is generated using the secret key as a piece of secret information and some public information that is specific to the particular escrow key for which the HMAC is being generated, such as certificate data or a public key. In an alternative embodiment, a regular hash of the secret key and the certificate data (or public key) is used instead of an HMAC. Although the resultant hash in embodiments that utilize a regular hash would be cryptographically weaker, the use of a regular hash may, nevertheless, find application in certain scenarios.

If the secret key is not changed during each save operation, or for other entropy purposes, in some embodiments, a random salt value for each escrow key is generated and included in the hash or HMAC, as the case may be. This salt value is then stored in the file container with the remainder of the escrow key data.

From operation 104, the method 100 proceeds to operation 106, wherein certificate data is hashed using the secure hash generated in operation 104 to generate validation data for the escrow key. Alternatively, a public key may be used instead of certificate data. The method 100 then proceeds to operation 108, wherein the validation data, the certificate data, and the encrypted secret key are written into the file container for the file. Alternatively, all or a portion of this data is written directly into the file. The method 100 then proceeds to operation 110, wherein the file container is saved. From operation 110, the method 100 proceeds to operation 112, wherein the method 100 ends.

Figure 2A:
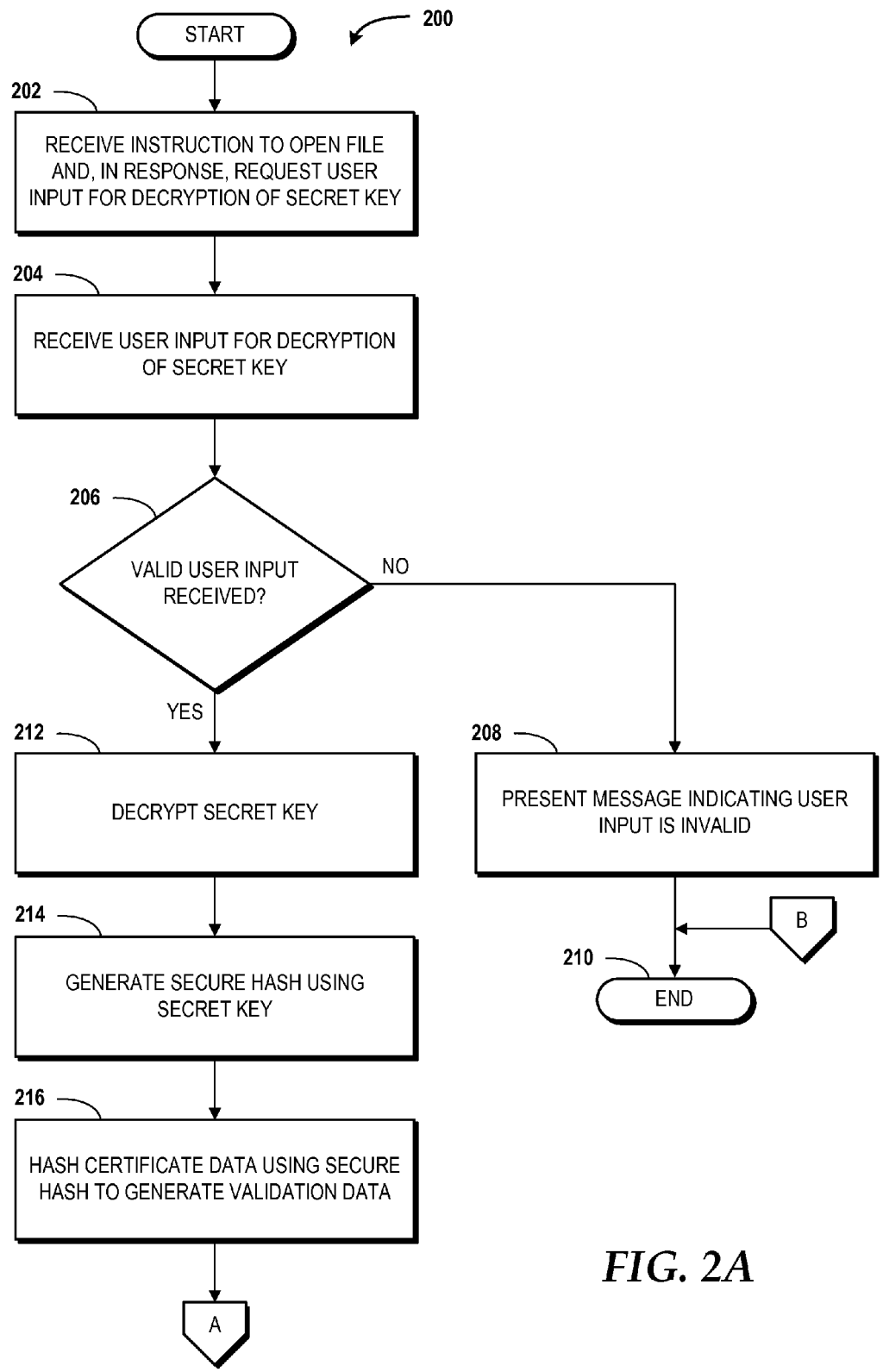
FIGS. 2A and 2B are flow diagrams showing aspects of a method for validating one or more escrow keys, according to an illustrative embodiment.
Figure 2B:
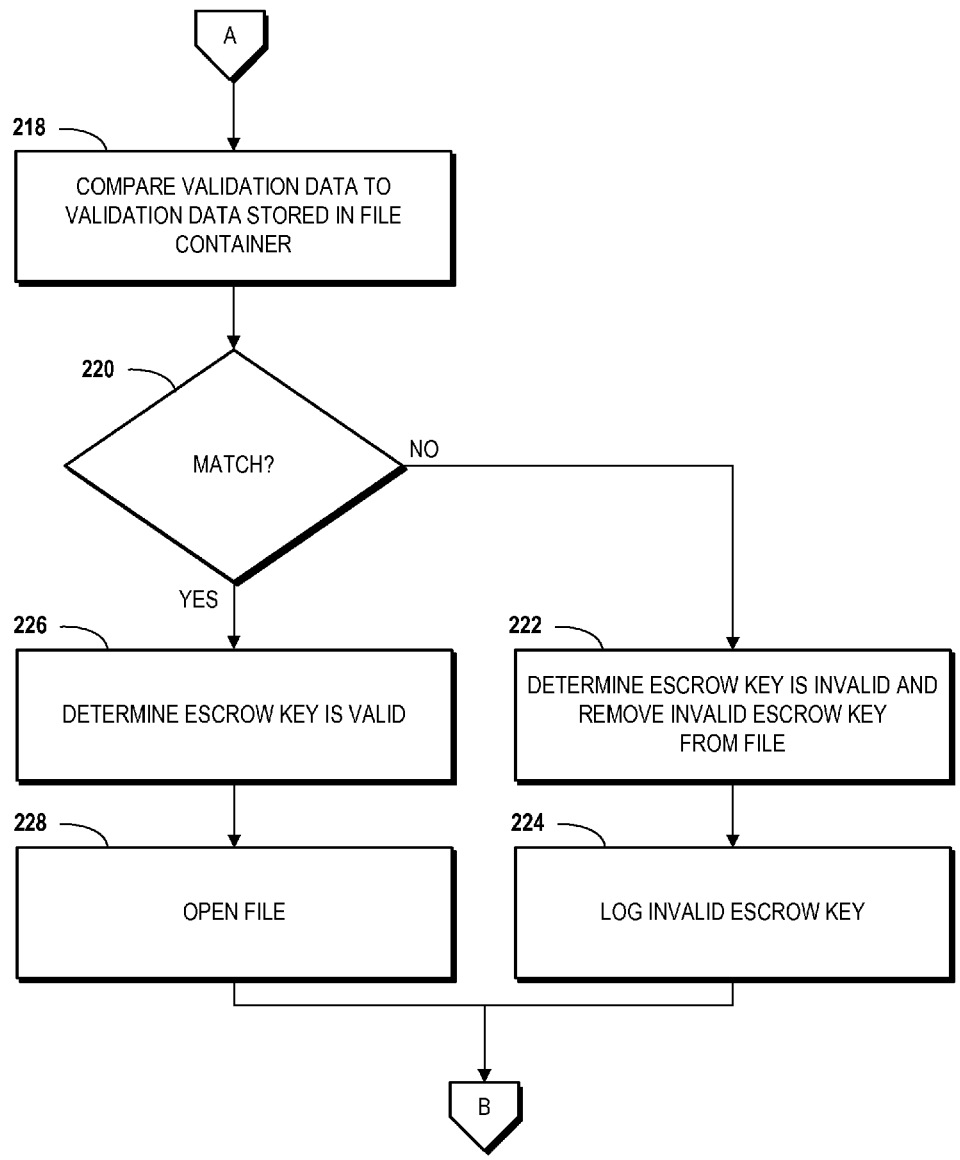

Turning now to FIGS. 2A and 2B, aspects of a method 200 for validating one or more escrow keys will be described in detail. The method 200 is described as being performed during an open operation to open the file that was saved during the execution of the save operation described above with reference to the method 100 illustrated in FIG. 1. The aspects described herein below also are not necessarily particular to a certain application, application type, file, or file type. In some embodiments, the application is configured to open and permit editing of the file. In some embodiments, the application is configured to open the file, but may or may not have the capability to perform operations beyond opening. For instance, the application, in some implementations, may not be configured to edit the file in any way. In some embodiments, the application used to open the file according to the method 200 is the same application used to save the file according to the method 100, described above. In other embodiments, these applications are different. The computer system or device used to save the file may be the same or different than the computer system or device used to open the file.

Turning first to FIG. 2A, the method 200 begins and proceeds to operation 202, wherein an instruction to open the file is received. In response to the instruction to open the file, user input for decryption of the secret key is requested. In some embodiments, the request for user input is a notification presented within the application prompting a user to provide the user input, although the request may take alternative forms. In some embodiments, the requested user input is an authentication credential such as, but not limited to, a password, passcode, personal identification number, security question/answer, passphrase, voice passphrase, another security certificate, combinations thereof, and the like. In some embodiments, the requested user input includes a request for multi-factor authentication credentials from two or more of the following categories: something one has, something one is, something one knows, something one has done, and somewhere one is located.

The instruction to open the file may be received through a GUI or other user interface presented by or for an application configured to open the file. The GUI may be represented as a menu or part of a menu, as an icon, as a ribbon interface or part of a ribbon interface, as a pop-up GUI or part of a pop-up GUI, some combination thereof, or the like. Alternatively, the instruction to open the file may be received via an interface device, such as a keyboard, keypad, mouse, gamepad, remote control device, or via any other interface device that, through one or more buttons, touchscreens, touchpads, microphones, or other man-machine interface that provides a mechanism by which a user can instruct the application to open the file. A dedicated or programmed physical open button on one or more of these interface devices is contemplated.

From operation 202, the method 200 proceeds to operation 204, wherein user input responsive to the request for user input in operation 202 is received. The method 200 then proceeds to operation 206, wherein a determination is made as to whether or not the user input received in operation 204 is valid. This determination may be made based upon comparing the user input received in operation 204 to an expected user input, such as an expected password or other expected authentication credential. The expected user input may be stored on the same computer or device on which the application is executing, or may be stored remotely such as on an authentication server configured to validate the user input received at operation 204.

If, at operation 206, it is determined that the user input is not valid, the method 200 proceeds to operation 208, wherein a message indicating that the user input is invalid is presented. Alternatively, no message indicating the user input is invalid is presented. In some embodiments, the application closes upon or at a time after the determination that the user input is not valid is made. In any case, the method 200 then proceeds to operation 210, wherein the method 200 ends.

If, at operation 206, it is determined that the user input is valid, the method 200 proceeds to operation 212, wherein the secret key is decrypted. From operation 212, the method 200 proceeds to operation 214, wherein a secure hash is generated using the secret key. The secure hash generated in operation 214, in some embodiments, is an HMAC. In some embodiments, the HMAC is generated using the secret key as a piece of secret information and some public information that is specific to the particular escrow key for which the HMAC is being generated, such as certificate data or a public key. In an alternative embodiment, a regular hash of the secret key and the certificate data (or public key) is used instead of an HMAC. Although the resultant hash in embodiments that utilize a regular hash would be cryptographically weaker, the use of a regular hash may, nevertheless, find application in certain scenarios.

From operation 214, the method 200 proceeds to operation 216, wherein the certificate data is hashed using the secure hash generated in operation 214 to generate validation data for the escrow key. Alternatively, a public key may be used instead of certificate data. The method 200 then proceeds to FIG. 2B and, particularly, to operation 218. At operation 218, the validation data generated in operation 216 is compared to the validation data saved in the file container in operation 110 of FIG. 1. From operation 218, the method 200 proceeds to operation 220, wherein a determination is made as to whether or not a match exists between the two validation data sets.

If, at operation 220, it is determined that a match does not exist between the validation data sets, the method 200 proceeds to operation 222, wherein it is determined that the escrow key is invalid and the invalid escrow key is removed from the file. The method 200 then proceeds to operation 224, wherein the invalid escrow key is logged. In some embodiments, a system audit is generated so that a company or other entity that has an interest in the security of the file can be made aware of the possible attempt at a security breach. Alternatively, the invalid escrow key is not logged. In any case, the method 200 then proceeds back to FIG. 2A and, particularly, to operation 210, wherein the method 200 ends.

In another embodiment (not illustrated), at operation 224, the method 200 proceeds to operation 228, wherein the file is opened. In this embodiment, a warning indicating that the file may have been tampered with can be presented the user. The method 200 can then proceed back to FIG. 2A and, particularly, to operation 210, wherein the method 200 ends.

If, at operation 220, it is determined that a match does exist between the validation data sets, the method 200 proceeds to operation 226, wherein it is determined that the escrow key is valid. The method 200 then proceeds to operation 228, wherein the file is opened. From operation 228, the method 220 proceeds back to FIG. 2A and, particularly, to operation 210, wherein the method 200 ends.

Although escrow keys are described in FIG. 2 as being validated during an open operation, it should be understood that escrow keys alternatively may be validated during a save operation, as a background task, or responsive to a specific pre-defined input.

Figure 3:
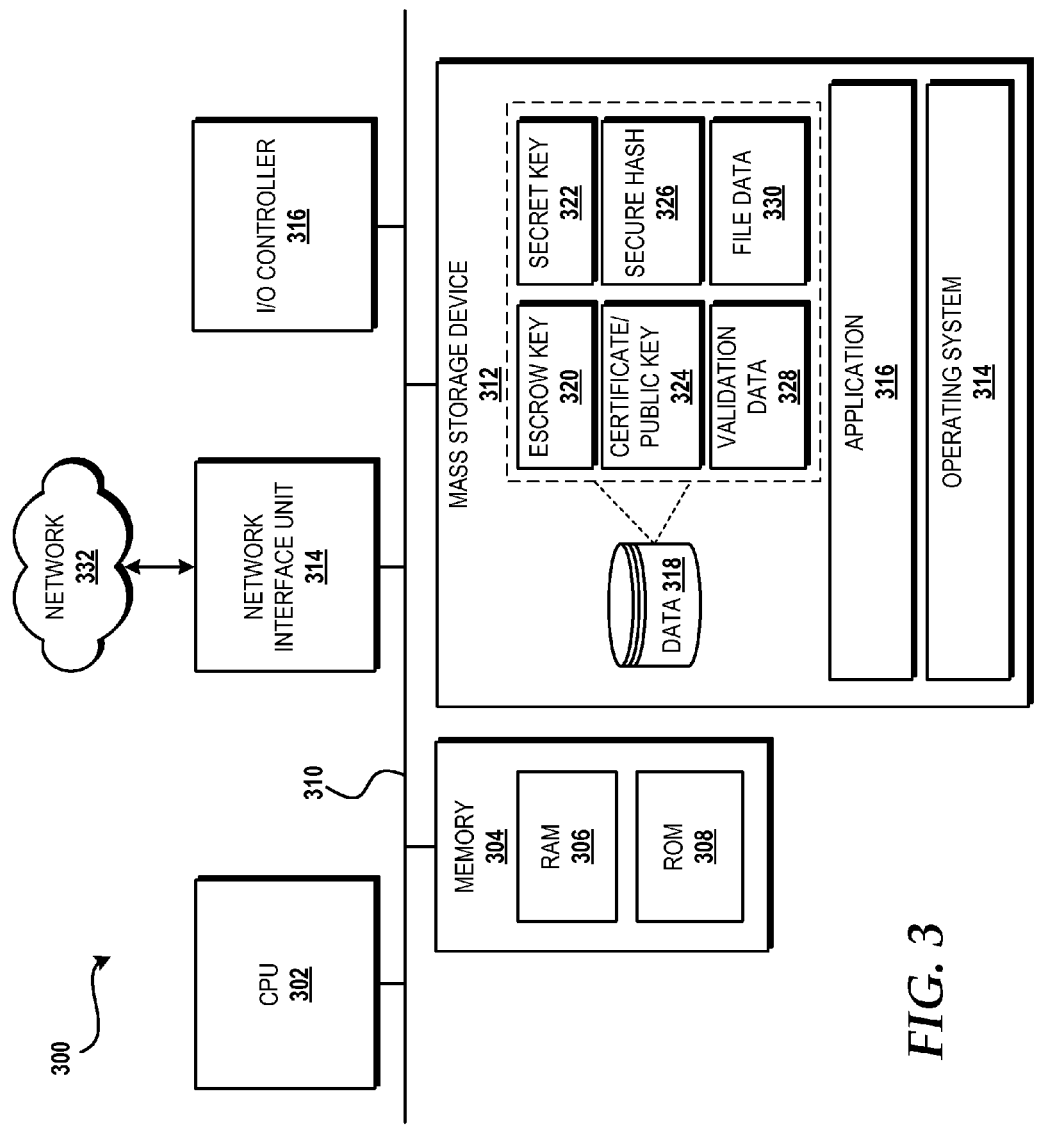
FIG. 3 is a computer architecture diagram illustrating an illustrative computer hardware and software architecture for a computing system capable of implementing aspects of the embodiments presented herein.

FIG. 3 illustrates an illustrative computer architecture 300 for a device capable of executing the software components described herein for the detection of invalid escrow keys. Thus, the computer architecture 300 illustrated in FIG. 3 illustrates an architecture for a server computer, mobile phone, a PDA, a smart phone, a desktop computer, a netbook computer, a tablet computer, and/or a laptop computer. The computer architecture 300 may be utilized to execute any aspects of the software components presented herein.

The computer architecture 300 illustrated in FIG. 3 includes a central processing unit 302 ("CPU"), a system memory 304, including a random access memory 306 ("RAM") and a read-only memory ("ROM") 308, and a system bus 310 that couples the memory 304 to the CPU 302. A basic input/output system containing the basic routines that help to transfer information between elements within the computer architecture 300, such as during startup, is stored in the ROM 308. The computer architecture 300 further includes a mass storage device 312 for storing an operating system 314, an application 316, and data 318. The data 318 includes one or more escrow keys 320, one or more secret keys 322, one or more certificates or public keys 324, one or more secure hashes 326, validation data 328, and file data 330, such as the escrow keys, secret keys, certificates, secure hashes, validation data, and file data described herein above.

The CPU 302 is configured to execute the operation system 314. The operations system 314 is an application program for controlling the operation of the computer architecture 300. The application 316 is an executable program configured to execute on top of the operating system 314 to provide various functionality described herein. For instance, the application 316 may provide the save operation and open operations described above with reference to FIGS. 1 and 2A/2B, respectively, with regard to validating escrow keys. In some embodiments, the application 316 is configured to open a file in a first state, receive user input such as edits or other interactions, and save the file in a second state that is different from the first state. In other embodiments, the application 316 is configured to save the file even when no changes are made to the file data 330. In some embodiments, the file is saved with changes to metadata, formatting parameters, or to other data contained within the file that is not viewable data. In some embodiments, the application 316 is configured to save the file, but may or may not have the capability to perform operations beyond opening and saving. For instance, the application 316, in some implementations, may not be configured to edit the file in any way.

In some embodiments, the application 316 is a word processing application such as MICROSOFT WORD, available from Microsoft Corporation of Redmond, Wash.; a spreadsheet application such as MICROSOFT EXCEL, available from Microsoft Corporation of Redmond, Wash.; a presentation application such as MICROSOFT POWERPOINT, available from Microsoft Corporation of Redmond, Wash.; a drawing application such as MICROSOFT VISIO, available from Microsoft Corporation of Redmond, Wash.; or a collaboration application such as MICROSOFT SHAREPOINT, available from Microsoft Corporation of Redmond, Wash. Alternatively or additionally, the application 316 is a web-based version of one or more of the aforementioned document creation applications and, in these embodiments, the computer architecture 300 functions as an architecture of a server computer configured to provide the application 316 as a web-based application.

The mass storage device 312 is connected to the CPU 302 through a mass storage controller (not shown) connected to the bus 310. The mass storage device 312 and its associated computer-readable media provide non-volatile storage for the computer architecture 300. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 300.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 300. For purposes of the claims, the phrase "computer storage medium" and variations thereof, does not include waves, signals, and/or other transitory and/or intangible communication media, per se.

According to various embodiments, the computer architecture 300 may operate in a networked environment using logical connections to remote computers through a network 332. The network 332 may be an internet, the Internet, an intranet, or an extranet. Access to the network 332 may be provided via one or more wired or wireless access networks (not shown), as will be understood by those skilled in the art.

The computer architecture 300 may connect to the network 332 through a network interface unit 314 connected to the bus 310. It should be appreciated that the network interface unit 314 also may be utilized to connect to other types of networks and remote computer systems. The computer architecture 300 also may include an input/output controller 316 for receiving and processing input from a number of other devices, including a keyboard, mouse, electronic stylus, or other input device (not shown in FIG. 3). Similarly, the input/output controller 316 may provide output to a display screen, a printer, or other type of output device (also not shown in FIG. 3).

It should be appreciated that the software components described herein may, when loaded into the CPU 302 and executed, transform the CPU 302 and the overall computer architecture 300 from a general-purpose computing system into a special-purpose computing system customized to facilitate the functionality presented herein. The CPU 302 may be constructed from any number of transistors or other discrete circuit elements, which may individually or collectively assume any number of states. More specifically, the CPU 302 may operate as a finite-state machine, in response to executable instructions contained within the software modules disclosed herein. These computer-executable instructions may transform the CPU 302 by specifying how the CPU 302 transitions between states, thereby transforming the transistors or other discrete hardware elements constituting the CPU 302.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 300 in order to store and execute the software components presented herein. It also should be appreciated that the computer architecture 300 may include other types of computing devices, including hand-held computers, embedded computer systems, personal digital assistants, and other types of computing devices known to those skilled in the art. It is also contemplated that the computer architecture 300 may not include all of the components shown in FIG. 3, may include other components that are not explicitly shown in FIG. 3, or may utilize an architecture completely different than that shown in FIG. 3.

Based on the foregoing, it should be appreciated that technologies for the detection of invalid escrow keys have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for generating escrow key validation data, the computer-implemented method comprising performing computer-implemented operations for:

receiving, using a computer, an instruction to save a file;

generating, using the computer, a secure hash using a secret key, the secret key being used to encrypt the file;

hashing, using the computer, a public key using said secure hash to generate validation data for an escrow key, wherein the validation data is generated for use as part of a validation operation to validate the escrow key during a later operation performed on the file and to perform said file operation upon determining that the escrow key is valid; and saving, using the computer, the validation data, the public key, and the secret key.

2. The computer-implemented method of claim 1, wherein the secure hash is a Hash-based Message Authentication Code ("HMAC").

3. The computer-implemented method of claim 1, wherein the later operation performed on the file is an open operation, a re-save operation, or a background task.

4. The computer-implemented method of claim 3, wherein the later operation is performed on the computer.

5. The computer-implemented method of claim 3, wherein the later operation is performed on another computer.

6. The computer-implemented method of claim 1, further comprising:

receiving an instruction to open the file;

in response to receiving the instruction to open the file, requesting user input for decryption of secret key;

receiving user input;

determining if the user input is valid;

in response to determining that the user input is valid,
decrypting the secret key,
generating a further secure hash using the secret key,
hashing the public key using the further secure hash to generate further
validation data for the escrow key,
comparing the validation data to the further validation data,
if the validation data matches the further validation data, determining that the escrow key is valid and opening the file, and
if the validation data does not match the further validation data, determining that the escrow key is not valid and removing the invalid escrow key from the file.

7. The computer-implemented method of claim 6, further comprising logging the invalid escrow key.

8. The computer-implemented method of claim 7, wherein logging the invalid escrow key comprises generating a system audit.

9. The computer-implemented method of claim 1, further comprising:

generating a salt value for the escrow key; and
adding the salt value to the secure hash.

10. The computer-implemented method of claim 1, wherein saving the validation data, the public key, and the secret key comprises saving the validation data, the public key, and the secret key to the file.

11. The computer-implemented method of claim 1, wherein saving the validation data, the public key, and the secret key comprises saving the validation data, the public key, and the secret key to a file container that contains the file.

12. A computer-implemented method for validating escrow keys, the computer-implemented method comprising performing computer-implemented operations for:

receiving, using a computer, an instruction to perform an operation on a file, the file having validation data for an escrow key associated therewith, the validation data having been generated by hashing certificate data using a secure hash, which was generated from a secret key, being used to encrypt the file, during a save operation performed on the file;

in response to receiving the instruction to perform the operation on the file, requesting, using the computer, user input for decryption of the secret key;

receiving, using the computer, user input;

determining, using the computer, if the user input is valid;

in response to determining that the user input is valid,
decrypting, using the computer, the secret key,
generating, using the computer, a further secure hash using the secret key,
hashing, using the computer, the certificate data using the further secure hash to generate further validation data for the escrow key,
comparing, using the computer, the validation data to the further validation data,
if the validation data matches the further validation data, determining, using the computer, that the escrow key is valid and performing the operation on the file, and
if the validation data does not match the further validation data, determining, using the computer, that the escrow key is not valid and removing the invalid escrow key from association with the file.

13. The computer-implemented method of claim 12, wherein the secure hash and the further secure hash are Hash-based Message Authentication Codes ("HMACs").

14. The computer-implemented method of claim 12, wherein the operation is an open operation, a re-save operation, or a background task.

15. The computer-implemented method of claim 12, further comprising logging the invalid escrow key.

16. The computer-implemented method of claim 15, wherein logging the invalid escrow key comprises generating a system audit.

17. The computer-implemented method of claim 12, wherein, prior to receiving the instruction to perform the operation on the file, the file was saved comprising the validation data, the escrow key, the certificate data, and the secret key.

18. The computer-implemented method of claim 12, wherein, prior to receiving the instruction to perform the operation on the file, the file was saved in a file container, the file container comprising the validation data, the escrow key, the certificate data, and the secret key.

19. A computer storage device having computer-readable instructions stored thereupon that, when executed by a computer, cause the computer to:

receive an instruction to open a file, the file having validation data for an escrow key associated therewith, the validation data having been generated by hashing certificate data using a Hash-based Message Authentication Code ("HMAC"), which was generated from a secret key, being used to encrypt the file, during a save operation performed on the file;

in response to receiving the instruction to open the file, request and authentication credential for decryption of the secret key;

receive an authentication credential;

determine if the authentication credential is valid;

in response to determining that the authentication credential is valid,
decrypt the secret key,
generate a further HMAC using the secret key,
hash the certificate data using the HMAC to generate further validation data for the escrow key, compare the validation data to the further validation data, if the validation data matches the further validation data, determine that the escrow key is valid and open the file responsive to the instruction to open the file, and if the validation data does not match the further validation data, determine that the escrow key is not valid, remove the invalid escrow key from association with the file, and log the invalid escrow key.

20. The computer storage device of claim 19, further having computer-readable instructions stored thereupon that, when executed by the computer, cause the computer to:

prior to receiving the instruction to open the file, receive an instruction to save the file;

generate the HMAC from the secret key, the secret key being used to encrypt the file;

hash the certificate data using the HMAC to generate validation data for the escrow key; and write and save the validation data, the certificate data, and the secret key to the file or to a file container containing the file.

\* \* \* \* \*